United States Patent
Rollins

(10) Patent No.: US 6,922,940 B2
(45) Date of Patent: Aug. 2, 2005

(54) TERMITE BAIT STATION AND METHOD OF INSTALLING AND MONITORING SAME

(76) Inventor: R. Randall Rollins, 2170 Piedmont Rd., Atlanta, GA (US) 30324

( * ) Notice: Subject to any disclaimer, the term of this patent is extended or adjusted under 35 U.S.C. 154(b) by 16 days.

(21) Appl. No.: 10/460,350

(22) Filed: Jun. 11, 2003

(65) Prior Publication Data

US 2004/0065001 A1 Apr. 8, 2004

Related U.S. Application Data

(62) Division of application No. 09/834,449, filed on Apr. 13, 2001, now Pat. No. 6,631,583.

(51) Int. Cl.$^7$ ................................................ A01M 1/20
(52) U.S. Cl. ........................................................ 43/124
(58) Field of Search ........................ 43/124, 131, 132.1

(56) References Cited

U.S. PATENT DOCUMENTS

| | | | |
|---|---|---|---|
| 5,396,729 A | * | 3/1995 | Vejvoda ........................ 43/114 |
| 6,255,959 B1 | * | 7/2001 | Lake et al. ............... 340/693.5 |
| 6,474,015 B1 | * | 11/2002 | Lund et al. .................... 43/124 |

* cited by examiner

*Primary Examiner*—Teri Pham Luu
*Assistant Examiner*—Francis T. Palo
(74) *Attorney, Agent, or Firm*—Kilpatrick Stockton LLP

(57) ABSTRACT

There is disclosed an improved insect bait station and a method of treating insects with a toxicant. The improved insect bait station comprises a screw-shaped body and a top. The screw-shaped body at least partially defines a toxicant/bait-receiving chamber and defines at least one opening to the toxicant/bait-receiving chamber intermediate opposite ends of the body. The top defines an opening to the toxicant/bait-receiving chamber.

2 Claims, 6 Drawing Sheets

TERMITE BAIT STATION AND METHOD OF INSTALLING AND MONITORING SAME

CROSS-REFERENCE TO RELATED APPLICATION

The present application is a division of application Ser. No. 09/834,449 filed Apr. 13, 2001, now U.S. Pat. No. 6,631,583.

FIELD OF INVENTION

The present invention relates generally to insect bait stations, and, more specifically, to a termite bait station which is constructed in such a way that it facilitates both insect entry into the bait station and installation of the bait station below grade. The present invention also relates to a method of monitoring insect activity within an insect bait station.

BACKGROUND OF THE INVENTION

Many types of termites are soil dwellers (i.e., subterranean termites) and exist in large colonies that can contain several million termites. Members of the colony forage for food and burrow galleries or passageways in the soil outwardly from the colony or nest, and portions of food located by foraging termites are returned to the nest. Termites can be very destructive because of their voracious appetites, especially for wood or other cellulosic materials. The ability of termites to cause considerable damage is in part due to the fact that the termites and external signs of damage is in part due to the fact that the termites are typically not seen until termite infestation is at a relatively advanced stage. Termites are difficult to detect and control because they are cryptic creatures that usually cause damage to the interiors of wooden structures, or otherwise in places that are not readily observable.

Traditional methods for controlling pests, such as termites, include preventive measures, such as pre-treatment of new construction sites with pesticidal agents to prevent subsequent infestation by pests. A more recent development in termite control technology pertains to the use of a termite bait matrix containing a relatively small amount of pesticide, such as a termiticide. In general, such methods and apparatus are directed to controlling pests once they have been detected as a result of a monitoring procedure. After detection, the pests are controlled by inducing the pests to ingest or otherwise come into contact with a toxicant in a bait matrix which is attractive to pests, particularly pests from a specified nest or colony.

Termite baiting systems provide significant advantages over traditional methods of controlling termites. Significantly, efficacious termite baiting systems typically require dramatically lower amounts of pesticide to control or eliminate termite infestation and may reduce the risk of pesticide exposure to non-target species and the environment.

U.S. Pat. No. 6,016,625 (the disclosure of which is incorporated herein by reference) discloses a termite baiting system. The termite baiting system disclosed in this patent includes a housing having openings sized to permit pests to pass through the openings so that pests can gain access to the interior of the housing from a location outside the housing. The station also comprises first and second devices adapted to be removably disposed within the housing in stacked relationship, wherein each of the first and second devices is either a pest-monitoring device or a pest-baiting device. The station further comprises a first extractor means adapted to be received in a channel defined within the housing. The housing is made from two half-cylindrical portions that snap together. The housing is typically used for in-ground applications; i.e., at least partially buried under ground.

In order to install the bait station disclosed in U.S. Pat. No. 6,016,625 for below grade applications, a hole must be formed in the soil. U.S. Pat. No. 5,862,658 (the disclosure of which is incorporated herein by reference) discloses such holes as being approximately two inches in diameter and about fourteen inches deep and being formed with a drill and bit. The patent also discloses an apparatus for removing grass from an area around the hole for a termite bait station. This patent is disclosed as being useful with the Sentricon System bait station manufactured by Dow Elanco.

These prior art termite bait stations are not entirely desirable because they have multiple parts, which complicate assembly of the apparatus. Loss or breakage of these parts is also a problem. Furthermore, such prior art bait stations are relatively easy to pull out of the ground, thereby posing a hazard to small children. Additionally, these prior art termite bait stations are relatively difficult to install and require additional tools to properly install such apparatus below grade.

Thus, there is a need in the art for an insect bait station that is relatively simple to install below grade and has few parts to break or lose. There is also a need in the art for an insect bait station that is relatively easy to install below grade and is relatively difficult to remove from the soil without a special tool designed for use with the bait station. Furthermore, there is a need in the art for an insect bait station that reduces the possibilities of human exposure to toxicants and/or toxic baits. Finally, there is a need for an automated system to record data about the location of installed insect bait stations and data regarding periodic inspection of those installed bait stations.

SUMMARY OF THE INVENTION

The present invention satisfies the above-described needs by providing an improved insect bait station comprising a screw-shaped body and a top. The screw-shaped body at least partially defines a toxicant/bait receiving chamber and defines at least one opening to the toxicant/bait receiving chamber intermediate opposite ends of the body. The top defines an opening to the toxicant/bait-receiving chamber.

In an alternate embodiment, there is disclosed a method of installing the insect bait station of the present invention comprising the step of rotating an insect bait station comprising a screw-shaped body that at least partially defines a toxicant/bait receiving chamber, such that the body is at least partially covered by the soil, and such that the toxicant/bait receiving chamber is at least partially below grade.

The present invention also comprises an improved method of monitoring an insect bait station comprising the steps of inserting an insect bait station into soil, the bait station bearing identifying indicia and entering into an electronic data entry/storage device the identifying indicia for the insect bait station. The method also comprises entering into the electronic data entry/storage device information about the location of the insect bait station, such that the location information is associated with the identifying indicia. Other information, such as identifying indicia for a toxicant/bait container and inspection information is associated with the identifying indicia from the insect bait station and can also be entered and stored in and retrieved from the data entry/storage device.

Accordingly, it is an object of the present invention to provide an improved insect bait station and an improved method of installing an insect bait station below grade.

Another object of the present invention is to provide an insect bait station with improved safety.

A further object of the present invention is to provide an insect bait station in which the toxicant is confined within a container and will not fall out of the bait station.

Yet another object of the present invention is to provide an improved insect bait station monitoring system.

Still another object of the present invention is to provide an insect bait station which cannot be easily removed from the ground without a special tool for removing the insect bait station.

A further object of the present invention is to provide an insect bait station which has a flat profile after it is installed below grade so that it does not provide a tripping hazard and does not interfere with the use of home lawn implements, such as a lawn mower.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
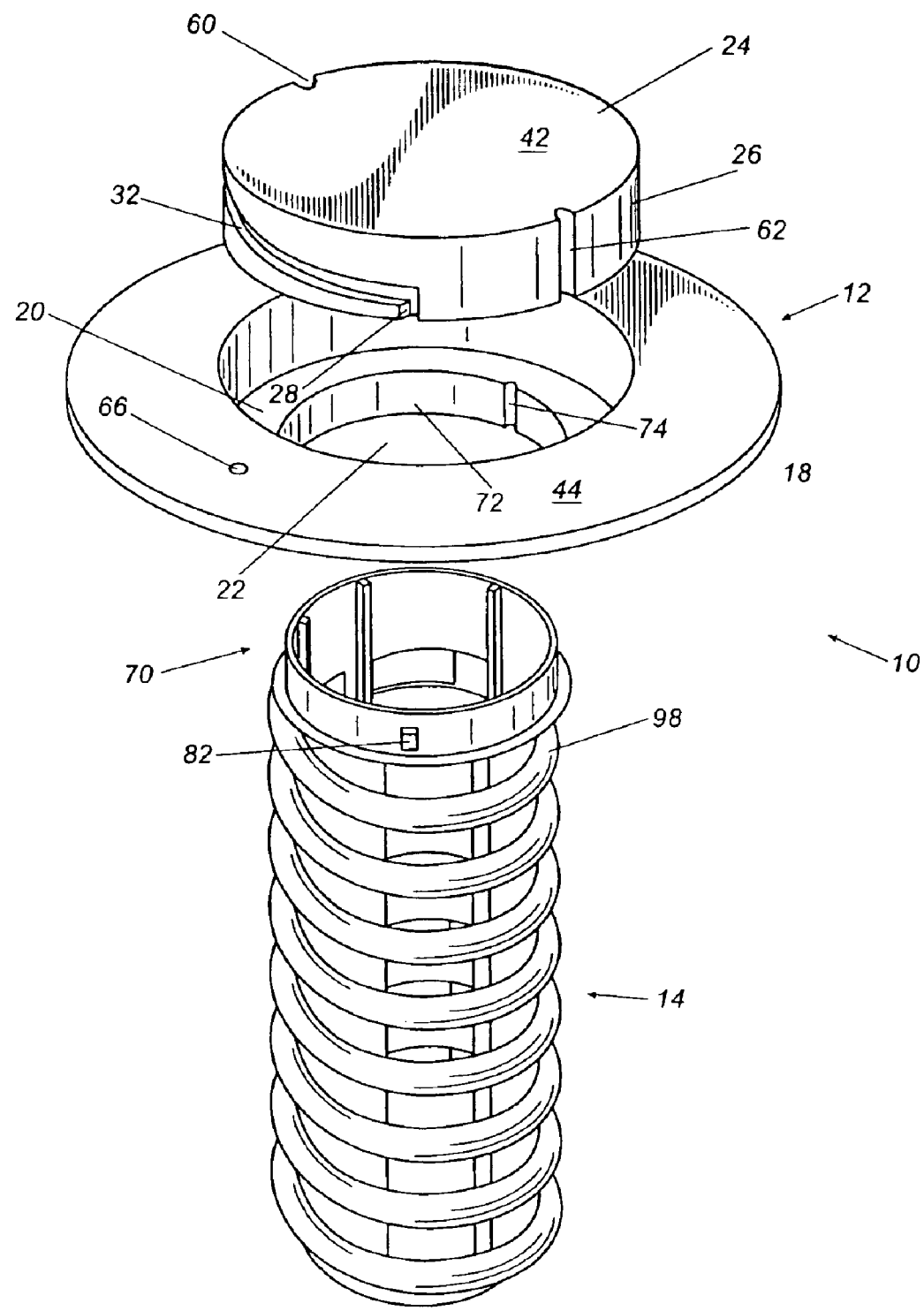
FIG. 1 is an exploded perspective view of a disclosed embodiment of the insect bait station of the present invention.
Figure 2:
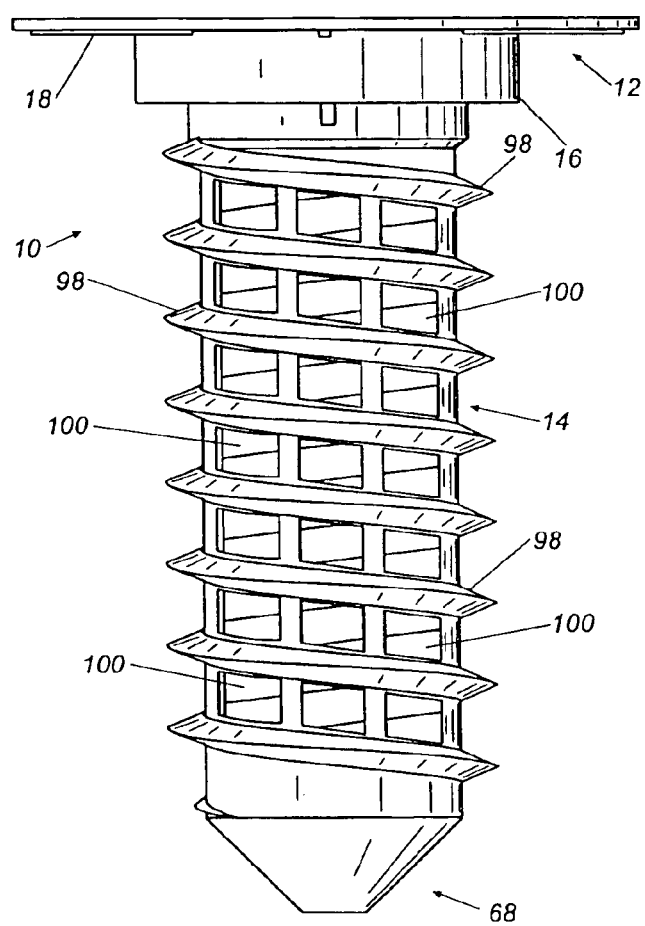
FIG. 2 is a side view of the insect bait station disclosed in FIG. 1, shown unexploded.

With reference to the drawing in which like numbers indicate like elements throughout the several views, it can be seen that there is an insect bait station 10 in accordance with the present invention. The insect bait station 10 is comprised of a top 12 and a body 14 (FIGS. 1 and 2). The top 12 comprises an annular collar 16 and a flat, peripheral, annular flange 18. Formed on the inside of the annular collar 16 is a shoulder 20. The annular collar 16, flange 18 and shoulder 20 define an opening 22.

Figure 5:
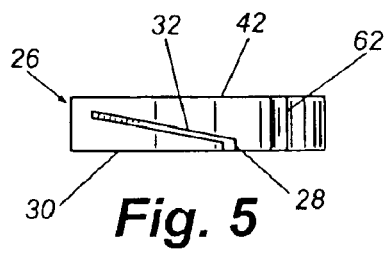
FIG. 5 is a side view of the sealing member shown in FIG. 1.
Figure 7:
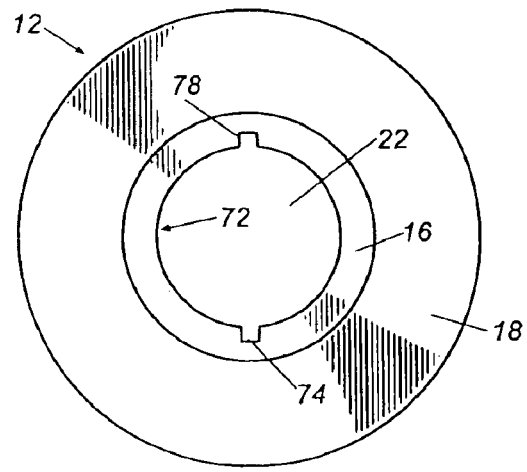
FIG. 7 is a bottom plan view of the top shown in FIG. 1.

The opening 22 is selectively sealable by a sealing member 24. The sealing member 24 is in the shape of a short cylinder, similar to the shape of a hockey puck. Formed in the edge 26 of the sealing member 24 is a vertical groove 28, which extends from the bottom surface 30 of the sealing member to a point approximately one-quarter of the thickness of the sealing member (FIG. 5). Also formed in the edge 26 of the sealing member 24 is a helical groove 32 that intersects the vertical groove 28 and extends around a portion of the edge of the sealing member in a helix or spiral segment. An identical vertical groove 34 and helical groove 36 are formed in the edge 26 of the sealing member 24 at a position 180° from the vertical groove 28 and helical groove 32.

Figure 6:
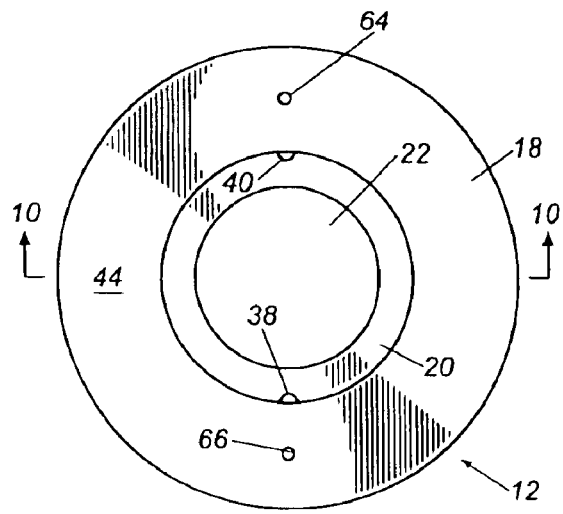
FIG. 6 is a top plan view of the top shown in FIG. 1.
Figure 4:
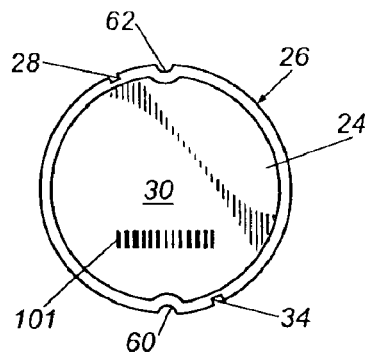
FIG. 4 is a bottom plan view of the sealing member shown in FIG. 1.

Formed on the inside of the collar 16 and extending radially inwardly are a pair of nibs 38, 40 (FIG. 6). The nibs 38, 40 are sized, shaped and adapted to mate with the grooves 28, 32, 34, and 36. That is, when the sealing member 24 is placed in the top 12 so as to seal the opening 22, the nib 38 slides in the vertical groove 28 and the nib 40 slides in the vertical groove 34. Then, as the sealing member 24 is rotated counterclockwise, the nib 38 slides in the helical groove 32 and the nib 40 slides in the helical groove 36. As the sealing member 24 is rotated, the nibs 38, 40 traveling in the grooves 32, 36 pull the sealing member toward the shoulder 20 until the sealing member contacts the shoulder and the bottom 30 of the sealing member seals against the shoulder. When sealed against the shoulder as described above, the top surface 42 of the sealing member 24 is flush with the top surface 44 of the flange 18. The sealing member 24 can be removed from the opening 22 by rotating the sealing member clockwise, so that the nib 38 slides in the helical groove 32 and the nib 40 slides in the helical groove 36, thus pushing the sealing member away from the shoulder 20. When the nibs 38, 40 reach the vertical grooves 28, 34, the sealing member 24 may be lifted upwardly so that the nibs 38, 40 disengage the vertical grooves 28, 34 and the sealing member is removed from the top 12.

Figure 9:
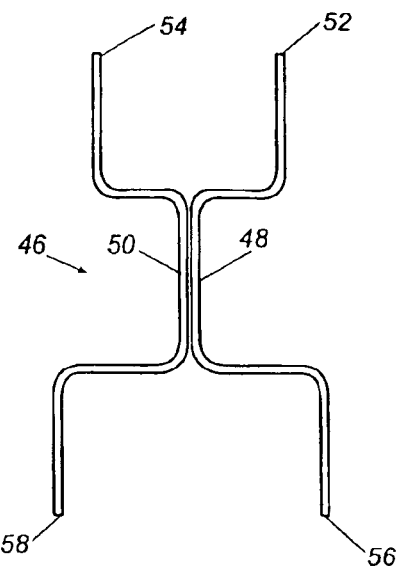
FIG. 9 is a side view of a disclosed embodiment of a tool for removing a sealing member from the insect bait station of the present invention and for installing in soil and removing from soil the insect bait station of the present invention.
Figure 10:
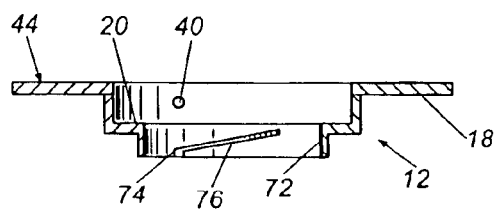
FIG. 10 is a cross-sectional view of the top shown in FIG. 6 taken along the line 10—10.

In order to assist with the rotation of the sealing member 24 to open and close the opening 22, a tool 46 (FIG. 9) is provided. The tool 46 comprises a pair of metal rods 48, 50, such as steel rods, bent into the shape as shown in FIG. 9. The metal rods 48, 50 are joined together by any suitable means, such as by welding. The tool 46 has sealing member engaging ends 52, 54 and flange engaging ends 56, 58. The ends 52, 54 are sized, shaped and adapted to be received in the grooves 60, 62 formed in the edge 26 of the sealing member 24. When the ends 52, 54 are received in the grooves 60, 62 of the sealing member 24, rotation of the tool 46 results in rotation of the sealing member. Thus, the tool 46 may be used to open and close the opening 22 of the top 12.

It should be noted that the distance between the ends 52, 54 of the tool 46 is the same as the distance between the grooves 60, 62 formed in the sealing member 24. The distance between the ends 56, 58 of the tool 46 is greater than the distance between the ends 52, 54. The ends 52, 54 are sized, shaped and adapted to be received in holes 64, 66 formed in the flange 18. When the ends 56, 58 are received in the holes 64, 66 of the flange 18, rotation of the tool 46 results in rotation of the flange. Thus, the tool 46 may be used to install the insect bait station 10 in soil and to remove the insect bait station from soil in a manner that will be described further below.

The body 14 of the insect bait station 10 of the present invention comprises a hollow cylinder having a closed, pointed soil-insertion end 68 and an open, opposite end or top end 70 adapted for attachment to the top 12. The body 14 attaches to the top 12 in a manner similar to the way the sealing member 24 attaches to the top. That is, the shoulder 20 has formed in its edge 72 a vertical groove 74 and a helical groove 76. Also located 180° from the vertical groove 74 and helical groove 76 on the edge 72 of the shoulder 20 is a matching vertical groove 78 and a helical groove (not shown). Formed on the outer surface of the body 14 adjacent the top 70 thereof are a pair of nibs 80, 82. The nibs 80, 82 are sized, shaped and adapted to mate with the grooves 74, 76, and 78. That is, when the top 70 of the body 14 is inserted into the top 12 so as to attached the body to the top 12, the nib 80 slides in the vertical groove 74 and the nib 82 slides in the vertical groove 78. Then, as the body 14 is rotated in a clockwise direction, the nib 80 slides in the helical groove 76 and the nib 82 slides in the opposite helical groove (not shown). As the body 14 is rotated, then nibs 80, 82 traveling in the helical groove 76 and the opposite groove (not shown) and pulls the body toward the shoulder 20 until a shoulder 84 on the body contacts the shoulder 20 and the top 70 of the body seals against the shoulder 20. The body 14 can, of course, be detached from the top 12 by rotating the body in a counterclockwise direction.

Figure 8:
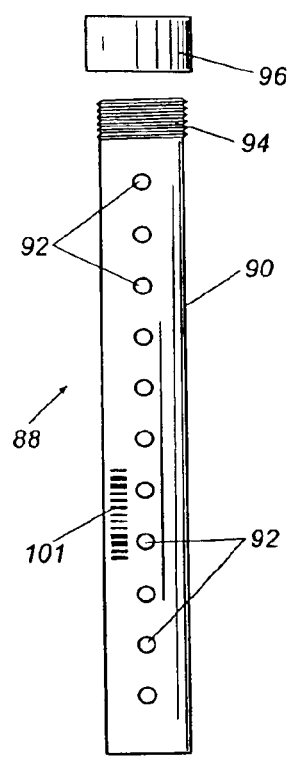
FIG. 8 is a side view of a disclosed embodiment of a toxicant/bait container of the present invention.
Figure 3:
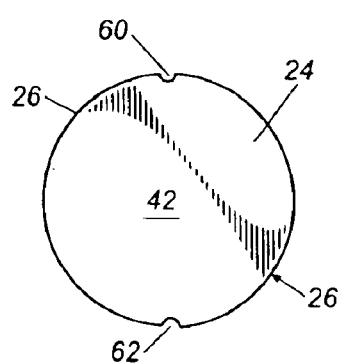
FIG. 3 is a top plan view of the sealing member shown in FIG. 1.
Figure 11:
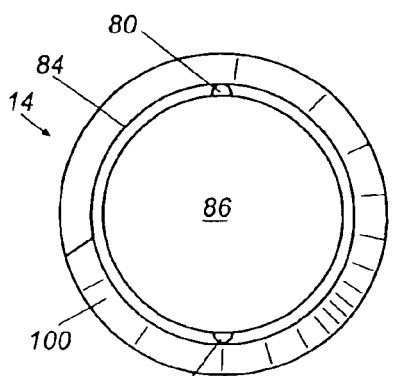
FIG. 11 is a top plan view of the body shown in FIG. 1.

The body 14 defines a toxicant/bait container-receiving chamber 86 (FIG. 11) into which a toxicant/bait container 88 (FIG. 8) can be placed. The toxicant/bait container 88 comprises an elongate, hollow tube 90 having a plurality of perforations or holes 92 along the length of the tube. The perforations or holes 92 are located on the four sides (not shown) of the tube 90. The tube 90 is adapted for containing a toxicant, bait or a toxicant/bait combination. The holes 92 are sized and shaped to permit a target insect, such as a termite, to enter the tube 90 and feed on the contents thereof and/or contacts the contents thereof. Located at the top of the tube 90 are male threads 94 which are designed to mate with female threads (not shown formed on the inside of a cap 96 such that the cap can be screwed onto the tube to seal the tube or screwed off of the tube in order to gain access to the interior of the tube through the top opening. The tube 90 and cap 96 are sized and shaped to be contained within the toxicant/bait container-receiving chamber 86 and to be easily manually insertible into the chamber and manually withdrawn from the chamber through the opening 22 in the top 12. However, since a toxicant is contained within the tube 90, human contact with the toxicant is reduced when placing the container 88 in the insect bait station or removing the container from the insect bait station.

The outer surface of the body 14 has formed thereon a plurality of screw threads 98. The screw threads 98 are sized, shaped and adapted to engage soil and to screw the body 14 into the soil by clockwise rotation of the body. Similarly, counterclockwise rotation of the body 14 removes the body from soil into which it has been inserted. The screw threads 98 are also sized and shaped in order to make it difficult to remove the body 14 from soil into which it has been inserted without rotating the body. That is, if one were to attempt to remove the body 14 from soil in which it was inserted merely by pulling on the top 12, removal from the soil would be difficult, if not impossible. This is a safety feature of the present invention and inhibits unauthorized persons, such as children or animals, from removing the insect bait station 10 from soil into which it has been inserted.

Formed between each adjacent screw thread 98 are a plurality of openings 100. The openings 100 are sized and shaped to permit a target insect, such as a termite, to enter and exit the chamber 86 from the surrounding soil into which the body 14 has been inserted.

The toxicant which is placed in the tube 90 of the toxicant/bait container 88 is not critical to the present invention except to the extent that the toxicant should not be repellent to the target insect. Therefore, contact-type poisons and ingestion-type poisons are suitable for use in the present invention. Examples of contact-type poisons which can be used in the present invention include chlorpyrifos, propoxur, isofenphos, acephate, carbamates, organophosphates, chlorinated hydrocarbon insecticides, any pyrethroids which are not repellent, insect growth regulators, such as diflubenzuron, fenoxycarb and luthenuron, and mixtures thereof. Ingestion-type poisons are useful in the present invention even though they are applied to the body of the insect because the poisons will be ingested during grooming by the target insect and/or by other insects within the target insect's colony. Examples of ingestion-type poisons which can be used in the present invention include sulfluramid, hydramethylnon, imidacloprid, boric acid, sodium borate, avermectins, fenitrothion, fenthion, hexaflumuron, fenoxycarb, methoprene, hydroprene, and diflubenzuron. Other contact-type poisons, ingestion-type poisons and fungi spores which can be used to destroy the target insects will be apparent to those skilled in the art. A list of suitable toxicants for termites is also listed in U.S. Pat. No. 6,016,625 (the disclosure of which is incorporated herein by reference).

It is particularly preferred that the toxicant which is used in the present invention be a delayed-action toxicant. It is desirable that the target insect be treated with the toxicant in the insect bait station, but that the insect not be killed immediately by the toxicant. It is preferred that the toxicant not kill the target insect until the target insect has had sufficient time to return to its nest or colony so that the toxicant can be transferred to other members of the target insect population. Delayed-action toxicants are well known to those skilled in the art. However, delayed-action toxicants which are useful in the present invention include sulfluramid, hexaflumuron, and avermectins. A suitable delayed-action toxicant useful in the present invention is the perfluorinated insecticide disclosed in U.S. Pat. No. 4,929, 696 (the disclosure of which is incorporated herein by reference).

The toxicants which are useful in the present invention can be in either liquid, gel, paste, solid or encapsulated form. If the toxicant is in a flowable form, such as liquid, gel or paste form, it can be absorbed onto, coated or otherwise impregnated into a suitable substrate using methods well known to those skilled in the art. If the toxicant is a solid, it can be combined with a liquid carrier, such as in a solution, dispersion or emulsion. The liquid carrier can then be adsorbed, coated or impregnated onto a substrate. The liquid carrier can then be optionally evaporated leaving the solid toxicant behind as a coating on the substrate. Other methods of applying the toxicant to a substrate will be apparent to those skilled in the art.

The particular bait which is used in the present invention is not critical and will depend on the particular target insect. Generally, the bait should attract the target insect so that the target insect will enter the insect bait station and be drawn to the bait in the toxicant/bait container 88. Many such baits are well known to those skilled in the art and include pheromones (e.g., hepta butyrate and Periplanone B), substances which possess food odors (including food materials), such as fats, oils, proteins, corn glutin, soy protein, carbohydrates, starches, sugars (e.g., dextrose, fructose, maltose, sucrose, and molasses), water and mixtures thereof. A particularly preferred insect attractant useful in the present invention is a sugar-based gel.

The material from which the insect bait station 10 of the present invention is made is not critical to the present invention. It is desirable, however, that the insect bait station 10 be made from a material that will not degrade due to exposure to the elements below grade. Therefore, it is desirable that the insect bait station be made from a plastic material, such as polyethylene or polypropylene. The length of the body 14 is also not critical to the present invention. However, it is desirable that the body be long enough to reach cool, damp soil even in hot dry climates. Therefore, it is desirable that the body be approximately 16 to 24 inches in length.

Use of the insect bait station 10 of the present invention will now be illustrated with respect to a system for monitoring termites around a residential home. The insect bait station 10 is assembled by inserting the open end 70 of the body 14 into the collar 16 of the top 12. The body 14 is secured to the top 12 by twisting the body member clockwise until the two members are locked together as described above.

For termite monitoring, it is desirable to position a plurality of the insect bait stations of the present invention in a pattern surrounding a home to be protected. Suitable locations around the home to be protected are identified and marked. An insect bait station 10 of the present invention is then installed below grade at each of the marked locations as follows. If the soil is sufficiently loose, the insect bait station 10 can be installed in the soil by placing the pointed end 68 of the body 14 in contact with the soil and rotating the top 12 in a clockwise direction while applying a downward force thereto. The tool 46 can also be used to aid in installation. The ends 56, 58 of the tool 46 may be placed in the holes 64, 66 in the flange 24 to assist in rotating the top 12 and body 14. The threads 98 on the body 14 grip the soil and apply a downward force to the body and screws the body into the soil in the same way that a wood screw is screwed into a piece of wood. The insect bait station 10 of the present invention is screwed into the soil until the flange 18 contacts the soil.

If the soil is too hard, however, it may be necessary to dig a hole in the soil into which the insect bait station is to be installed. The insect bait station 10 is then placed in the hole and soil may be placed back into the dug hole so as to surround and bury the body 14. The hole into which the insect bait station is placed should be only deep enough so that the flange 18 of the top 12 is flush with the surrounding soil.

After the insect bait station 10 is installed below grade, the toxicant/bait container 88, which contains only a suitable termite bait, is placed into the chamber 86 through the opening 22 in the top 12. Alternately, a block of wood or cellulose approximately the same size as the toxicant/bait container 88 is placed in the chamber 86. The sealing member 24 is then placed over the opening 22 and rotated in a counterclockwise direction with the tool 46 to seal the opening in the manner described above.

Termites foraging for food near the insect bait station 10 can enter the station through one of the openings 100 in the body 14. This gives the termite access to the chamber 86 containing the toxicant/bait container 88. Termites within the chamber 86 can then enter the tube 90 through one of the holes 92 and feed on the contents of the tube, which in this case is only a bait. After feeding on the bait, the termite can exit the tube through one of the holes 92 and can exit the chamber 86 through one of the openings 100.

Insect activity in the insect bait station 10 can be monitored by removing the sealing member 24 by rotating it in a clockwise direction using the tool 46, as described above. The bait container 88 can then be easily removed from the chamber 86 by hand and visually inspected. If the bait in the tube 90 is undisturbed, the container 88 is placed back in the chamber 86 and the opening 22 resealed. If the bait shows signs of insect activity, such as being partially eaten, a different container 88 containing either only a toxicant or a combination of toxicant and bait or a mixture of a toxicant and bait is placed in the chamber 86 and the opening 22 resealed. Then, when foraging termites revisit the insect bait station, they will consume either the toxicant, a mixture of toxicant and bait, or bait and toxicant in distinct layers or portions.

If the toxicant is a fast-acting contact-type poison, the insect will be killed shortly after contact with the toxicant in the tube 90. If the toxicant is an ingestion-type poison, the insect will not be killed until after it ingests the poison. It is therefore desirable that an ingestion-type poison display at least some delayed-action. If the insect is a social insect, such as an ant, wasp, termite or a cockroach, after exiting the insect bait station 10, the insect will return to its nest, colony or harbourage. As a result, at least some of the toxicant will be transferred from the treated insect to other members of the insect colony, such as by trophylaxis, cannibalism, and coprophagy or by other purposeful or incidental insect interaction.

It should be noted that the sealing member 24 is removed from the insect bait station 10 by clockwise rotation. This is opposite from the direction of rotation necessary to remove the body 14 of the insect bait station 10 from the soil. Thus, the threading of the sealing member 24 and the body 14 are opposite. This opposite threading is specifically contemplated as a feature of the present invention. First, the clockwise rotation of the sealing member 24 is opposite from that conventionally used for removing or unscrewing a member. Therefore, removal of the sealing member 24 by an unauthorized person, such as a child, may be inhibited. Furthermore, using a clockwise rotation of the sealing member 24 to remove it will not tend to disturb the position of the body 14 in the soil, since the clockwise rotation of the sealing member would only tend to screw the body further into the soil rather than remove the body from the soil. Generally, with a firm soil, the force necessary to remove the sealing member 24 will not be sufficient to turn the body member 14 in the soil. This is an important feature of the present invention, because if termites have visited the insect bait station 10, it is very important not to disturb the position of the insect bait station in the soil so as not to discourage insects, namely, termites, from revisiting the insect bait station. Termites are relatively "smart" insects and can detect slight disturbances of previous paths, usually due to the disturbance of trail pheromones left by the termite in its previous trip. Thus, any significant disturbance could cause the termite to take a different path than previously followed, and, thereby, avoid the insect bait station. The delayed action of the toxicants used in connection with the present invention rely on the insects returning to the same location and feeding on the toxicant. Accordingly, minimizing any disturbance of the body 14 in the soil is an important feature of the present invention.

An alternate disclosed embodiment of the present invention comprises a computer-assisted system for monitoring insect activity. When the toxicant/bait container 88 is placed in the chamber 86, it is preferred that the insect bait station 10 and the toxicant/bait container each bear an identifying indicia, preferably an optically scannable indicia, such as a bar code. It is specifically contemplated that either the cap 96 or the tube 90 would have applied to it a self-adhesive label bearing a unique optically scannable bar code and that the bottom surface 30 of the sealing member 24 would also have applied to it a self-adhesive label bearing a unique optically scannable bar code. Therefore, it is contemplated that the bar codes associated with the toxicant bait station 10 and the toxicant/bait container 88 would be optically scanned into a data entry/storage device (not shown) before the container is placed in the chamber 86.

Many suitable portable data entry/storage devices equipped with bar code scanners are commercially available and are useful in the present invention, such as devices used for inventory control in retail stores. Such devices are typically highly portable and are battery operated. They include two data input devices: one being a miniature keyboard for alpha/numeric data entry and the other being an optical scanner for bar code data entry. The data input devices are connected to a central processing unit ("CPU") which is either preprogrammed or is programmable to perform certain functions. The CPU is connected to a memory device for storing data entered from the data input devices, and optionally for storing programming for the CPU. These devices also include a data output device, such as an LCD display which is connected to the CPU for displaying data entry instructions from the CPU, for displaying entered data, for displaying data retrieved from the memory device and for displaying other instructions from the CPU. Such devices typically store and retrieve data from a computer database having predefined data fields. The database can be stored in the memory device or it can be transmitted to a remote location for storage and retrieval from a remote or central computer. A date entry/storage device suitable for use in the present invention is commercially available from Symbol Technologies, Inc. of Holtsville, N.Y.

Figure 12:
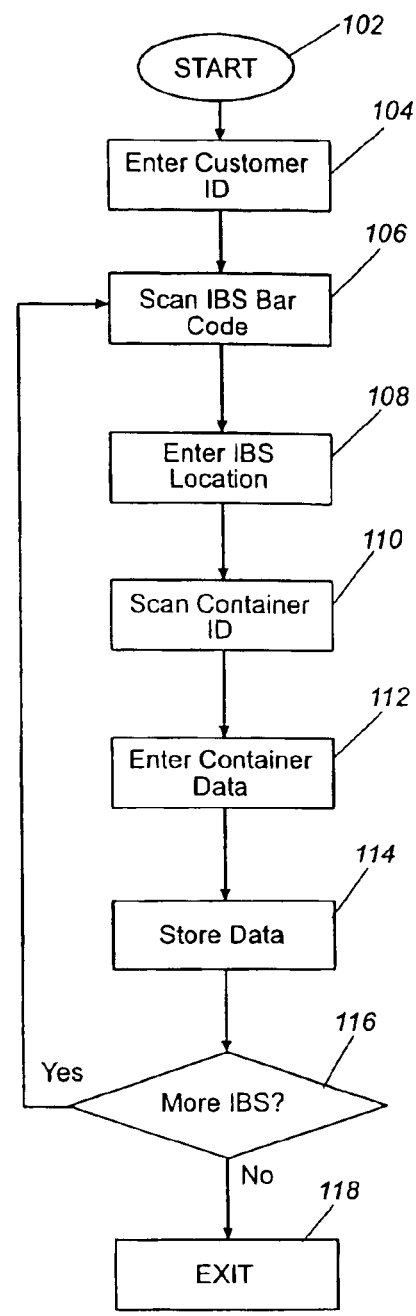
FIG. 12 is a flow diagram of a disclosed embodiment for the insect bait station management system of the present invention.
Figure 13:
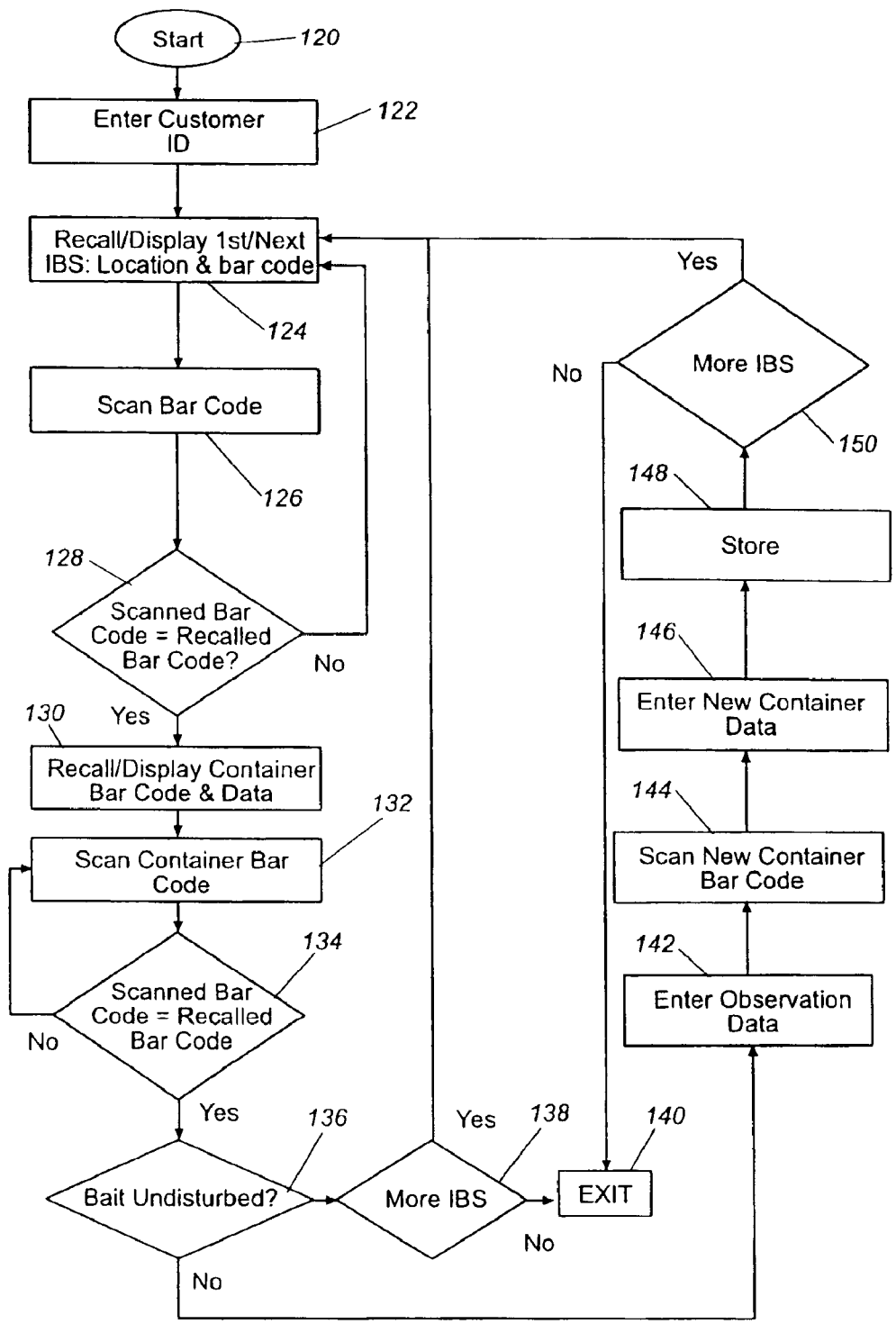
FIG. 13 is a flow diagram of another disclosed embodiment for the insect bait station management system of the present invention.

With reference to FIGS. 12 and 13, it will be seen that there is shown a system for installing and for monitoring insect activity in the insect bait station of the present invention. This system utilizes a computer database to store various data about the installation to be monitored. It is anticipated that the database would include at least the following fields for data entry: customer identification number; insect bait station bar code; insect bait station location; toxicant/bait container bar code; toxicant/bait container data; site inspection data; and date/time.

For a new installation, an operator after installing an insect bait station 10 at an installation site begins the computer-monitoring program, such as at 102 (FIG. 12). The operator enters a customer identification number, such as at 104. This initiates a database record for the specific customer. The operator then scans the bar code located on the bottom 30 of the sealing member 24, such as at 106, and enters the physical location of the insect bait station that he has just installed, such as at 108. By associating the physical location of the insect bait station with the bar code for the bait station and the customer identification number, when the operator returns at a later time to inspect the insect bait station, he can retrieve location information which will assist him in locating the insect bait station. The operator then scans the bar code located on the cap 96 of the toxicant/bait container 88, such as at 110, and enters information about the container, for example whether it is a bait, a toxicant or both, such as at 112. The operator places the container 88 in the receiving chamber 86 of the insect bait station and seals the opening 22 by rotating the sealing member clockwise with the tool 46, as described above. The information entered by the operator is then stored in the database, such as at 114. The computer then prompts the operator whether there are additional insect bait stations to be installed at this location, such as at 116. If there are additional insect bait stations to be installed, the operator responds "yes" the program creases another database record for that customer and returns the program to block 106 where the process begins again. Thus, the program prompts the operator to enter insect bait station bar code information, physical location information, container bar code information, and container information for each insect bait station that the operator installs at the customer's location. Additionally date and time information is automatically entered into the database, as the data is stored. If there are no more insect bait stations to install at this location, the program exits, such as at 118.

When the operator returns to the customer's location to periodically inspect the insect bait stations he previously installed, the operator starts the program, such as at 120, and enters the customer's identification number, such as at 122. The computer then retrieve all database records corresponding to the entered customer number and display's the first retrieved record, such as at 124, with the first insect bait station's location and bar code. Using the displayed insect bait station location information, the operator can easily identify the first insect bait station to be inspected. The operator unseals the opening 22 by rotating the sealing member 24 in a counterclockwise direction with the tool 46. The operator then scans the bar code located on the bottom 30 of the sealing member 24, such as at 126. The computer compares the bar code retrieved from the database with the scanned bar code, such as at 128. If the retrieved bar code and the scanned bar code do not match, the computer program returns to block 124 and again displays the insect bait station location information, because the operator must have been inspecting the wrong station. If the retrieved bar code and scanned bar code match, the computer program recalls the toxicant/bait container bar code and container information from the database, such as at 130. The computer then prompts the operator to scan the bar code on the toxicant/bait container, such as at 132, and then compares the scanned bar code to the retrieved bar code, such as at 134. If the bar codes do not match, the computer returns the operator to block 132, because there must have been an error in scanning the bar code. If the bar codes match, the operator is prompted to inspect the toxicant/bait container 88 and chamber 86 for signs of insect activity, such as at 136. If there is no sign of insect activity; i.e., the bait is undisturbed, the operator responds "yes" and the computer program stores the date and time of the inspection and the information that the bait was undisturbed. The program then determines whether there are any more records of insect bait stations at the customer's location that have not been inspected on that date, such as at 138. If there are more insect bait stations to be inspected, the program transfers to block 124 and displays the bar code and location of the next insect bait station to be inspected. The process is then repeated. If there are no more insect bait stations to be inspected, the program exists, such as at 140.

If at block 136, the operator respond "no," indicating that the bait is not undisturbed; i.e., there has been insect activity, the operator is prompted to enter his observation information, such as at 142. The operator then removes from the chamber 86 the toxicant/bait container 88, which contains only bait, and substitutes and new container that contains either only a toxicant or the combination of a toxicant and bait. The operator is then prompted to scan the bar code for the new container 88, such as at 144, and to enter new container information, for example the nature of the contents of the container, such as at 146. The computer then stores the new container bar code information and the new container information along with the date and time, such as at 148. The program then determines whether there are any more records of insect bait stations at the customer's location that have not been inspected on that date, such as at 150. If there are more insect bait stations to be inspected, the program transfers to block 124 and displays the bar code and location of the next insect bait station to be inspected. The process is then repeated. If there are no more insect bait stations to be inspected, the program exists, such as at 140.

By maintaining a record of each insect bait station at a customer's location and prompting an operator to inspect each insect bait station at that location, the system of the present invention insures that all bait stations at that location will be inspected. This insures that insect bait stations will not be accidentally missed because an operator could not find and insect bait station or could not remember where all of the insect bait stations were located. It also insures inspection of all insect bait stations for insect activity which is essential to a successful monitoring system. Furthermore, the system of the present invention makes it easy for a person other than the one that installed the insect bait stations to perform an inspection of those insect bait stations. The computer database containing all of the information described above also permits detailed inspection reports to be prepared.

Figure 14:
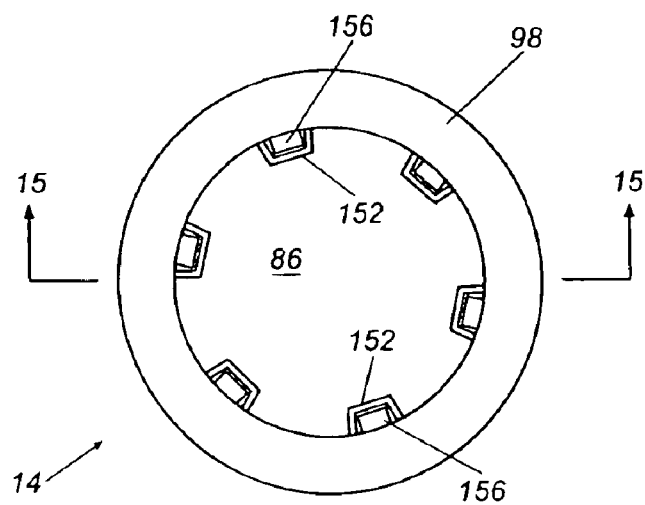
FIG. 14 is a top plan view of the body of an alternate embodiment of the present invention.
Figure 15:
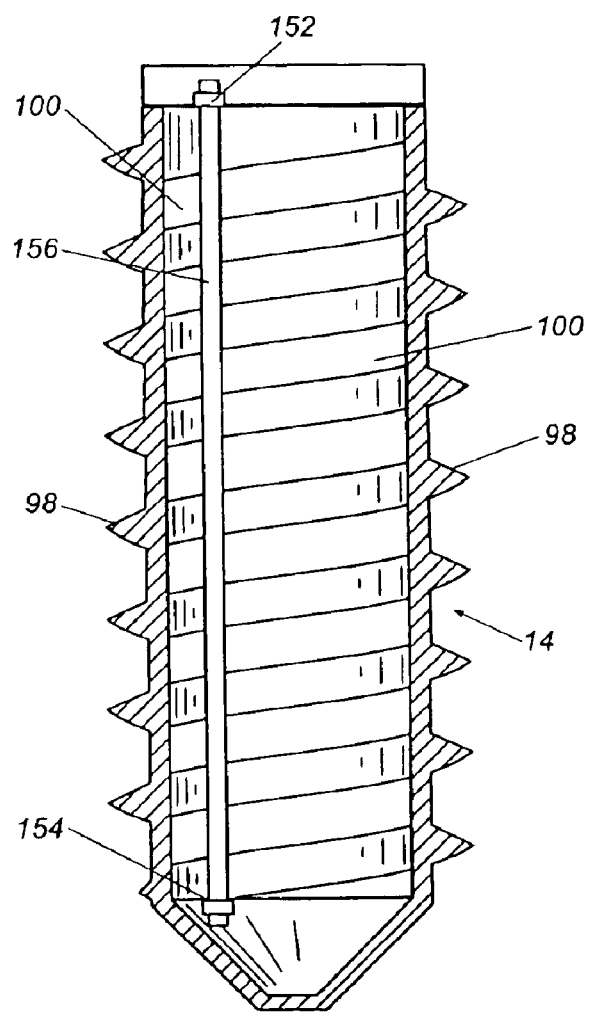
FIG. 15 is a cross-sectional view taken along the line 15—15 of the body shown in FIG. 14.

With reference to FIGS. 14 and 15, there is disclosed an alternate embodiment of the present invention. The body 14 includes a plurality of bait retaining brackets 152 disposed within the toxicant/bait container-receiving chamber 86 and extend outwardly from the interior wall thereof adjacent the top end 70 thereof. An identical set of bait retaining brackets 154 are disposed within the toxicant/bait container-receiving chamber 86 and extend outwardly from the interior wall thereof adjacent the insertion end 68 thereof. Each of the brackets 152 is axially aligned with a corresponding bracket 154, so that an elongate bait member 156, such as a stick of wood, can be inserted through the top bracket 152 and the bottom bracket 154 until the bait member contacts the bottom of the body 14 and is supported thereby. Thus, if an insect enters the toxicant/bait container-receiving chamber 86 through one of the openings 100 and feeds or otherwise consumes a portion of the bait member 156 at a point intermediate the top bracket 152 and the bottom bracket 154 such that the bait member is severed into two pieces, the upper portion of the bait member can slide out of the top bracket and fall to the bottom of the chamber. Thus, then an operator checks the bait station to see if the bait 156 has been eaten or consumed by an insect, it will be easy to notice that one or more of the bait members have fallen to the bottom of the body 14. This feature of the insect bait station of the present invention make observance of insect activity in the bait station easier to determine which leads to more accurate observations. Furthermore, after insect activity has been observed, the toxicant/bait container 88 can be inserted into the toxicant/bait container-receiving chamber 86, in the manner described above, without removing the remaining bait members 156. This feature minimizes the amount of disturbance of the body 14 in the ground in which it is buried, and therefore improves the chances that the target insect will return to the insect bait station 10 and consume the delayed action toxicant in the toxicant/bait container 88.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising the steps of:

inserting into soil an insect bait station, said bait station comprising:

a screw-shaped body member and a top member, said top member comprising a flange extending radially outwardly from said screw-shaped body member and also defining an opening to said toxicant/bait receiving chamber; and a sealing member for sealing said opening defined by said top member, said sealing member fitting flush with said flange, said sealing member bearing identifying indicia;

entering into an electronic data entry/storage device the identifying indicia for said insect bait station; and entering into said electronic data entry/storage device information about the location of said insect bait station, such that said location information is associated with said identifying indicia.

2. A method comprising the steps of:

inserting into soil an insect bait station bearing identifying indicia, said bait station comprising:

a body member defining a hollow bait receiving chamber; and a bait receiving bracket disposed in said bait receiving chamber, said bait receiving bracket being adapted to receive and retain an elongate bait member in an installation position, and further being adapted such that if said elongate bait member is at least partially consumed by an insect in said bait receiving chamber, said elongate bait member is no longer retained by said bait receiving bracket in said installation position;

entering into an electronic data entry/storage device the identifying indicia for said insect bait station; and entering into said electronic data entry/storage device information about the location of said insect bait station, such that said location information is associated with said identifying indicia.

* * * * *